US009696040B2

(12) United States Patent
Yoon et al.

(10) Patent No.: US 9,696,040 B2
(45) Date of Patent: Jul. 4, 2017

(54) DISPLAY DEVICE AND COOKING APPLIANCE HAVING THE SAME

(71) Applicant: LG ELECTRONICS INC., Seoul (KR)

(72) Inventors: Youngkook Yoon, Seoul (KR); Jaebong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/858,215

(22) Filed: Sep. 18, 2015

(65) Prior Publication Data
US 2016/0172147 A1 Jun. 16, 2016

(30) Foreign Application Priority Data

Dec. 11, 2014 (KR) .................. 10-2014-0178168

(51) Int. Cl.
*A47J 37/12* (2006.01)
*A47J 43/28* (2006.01)
(Continued)

(52) U.S. Cl.
CPC .............. *F24C 3/124* (2013.01); *F24C 7/082* (2013.01); *H05B 6/6435* (2013.01); *A47J 27/62* (2013.01); *A47J 45/068* (2013.01)

(58) Field of Classification Search
CPC ........ A47J 27/62; A47J 37/043; A47J 45/068; H04N 9/3197; H04N 1/0289;
(Continued)

(56) References Cited

U.S. PATENT DOCUMENTS 6,064,050 A  *  5/2000  Ishikawa ............... H05B 6/6435
                                                          177/245
2005/0016991 A1 * 1/2005  Wilsdorf ................. F24C 7/082
                                                          219/506
(Continued)

FOREIGN PATENT DOCUMENTS

JP     2009-289466        12/2009
KR  20-1992-0004455        3/1992
(Continued)

OTHER PUBLICATIONS

Notice of Allowance issued in Korean Application No. 10-2014-0178168 on May 24, 2016, 3 pages (with English translation).

*Primary Examiner* — Quang D Thanh
*Assistant Examiner* — Hemant Mathew
(74) *Attorney, Agent, or Firm* — Fish & Richardson P.C.

(57) ABSTRACT

A cooking appliance comprises a cabinet and a cooking unit provided in the cabinet and configured to perform cooking of food using a heat source. The cooking appliance also includes a display device configured to display cooking information for the cooking unit. The display device includes a display module configured to irradiate light of a first color to display information for a user and a circuit board arranged at a rear of the display module and configured to control the display module and supply power to the display module. The display device also includes a color conversion filter arranged at a front of the display module and configured to convert the light of the first color irradiated from the display module to light of a second color. The cooking appliance converts the color of light irradiated from the display module to a desired color by using the color conversion filter.

15 Claims, 5 Drawing Sheets

(51) Int. Cl.
*F24C 3/12* (2006.01)
*F24C 7/08* (2006.01)
*H05B 6/64* (2006.01)
*A47J 45/06* (2006.01)
*A47J 27/62* (2006.01)

(58) Field of Classification Search
CPC ............ H04N 1/02895; H04N 1/02885; G09F 9/302; G02B 5/02; G02B 5/00; H01K 1/32; F24C 3/124; F24C 7/082
USPC ....... 99/325, 341, 342; 345/32, 33; 313/112, 313/511, 111
See application file for complete search history.

(56) References Cited

U.S. PATENT DOCUMENTS

| | | | | |
|---|---|---|---|---|
| 2006/0279216 A1* | 12/2006 | Kim | ............... | G02B 6/0055 313/631 |
| 2008/0017046 A1* | 1/2008 | Huber | ............... | F24C 7/082 99/325 |
| 2008/0105887 A1* | 5/2008 | Narendran | ............ | B82Y 10/00 257/98 |
| 2008/0110449 A1* | 5/2008 | Brown | ............... | F24C 15/006 126/198 |
| 2010/0026632 A1* | 2/2010 | Ishida | ............... | H04M 1/22 345/170 |
| 2010/0123155 A1* | 5/2010 | Pickett | ............... | B82Y 15/00 257/98 |
| 2011/0085287 A1* | 4/2011 | Ebrom | ............... | G08C 17/02 361/679.01 |
| 2011/0163089 A1* | 7/2011 | Park | ............... | F24C 15/008 219/679 |
| 2013/0092032 A1* | 4/2013 | Cafferty | ............... | F24C 7/08 99/325 |

FOREIGN PATENT DOCUMENTS

KR  10-0816932  3/2008
KR  10-2008-0057424  6/2008

\* cited by examiner

DISPLAY DEVICE AND COOKING APPLIANCE HAVING THE SAME

This application claims the benefit of the Korean Patent Application No. 10-2014-0178168, filed on Dec. 11, 2014, which is hereby incorporated by reference as if fully set forth herein.

FIELD

The present disclosure relates to a cooling appliance having a display device, and, for example, to a cooking appliance having a display device provided with a color conversion filter to irradiate light from the display device to a user as a particular color (e.g., white).

BACKGROUND

Generally, cooking appliances may include products for cooking food at home or indoor by using electricity or other energy (for example, gas). Examples of the cooking appliances, which use gas as a heat source, may include a gas range, a gas oven and a gas oven range, and examples of the cooking appliances, which use electricity as a heat source, may include an induction range and a microwave oven. Also, a cooking appliance of a combination type of an induction range based on electricity and a gas oven based on gas may exist.

A cooking appliance may be provided with a display device having a display module configured to display a cooking complete time, a cooking course which is running, etc. for a user. The display module provided in the display device to irradiate light may be formed as a light emitting diode (LED) or a vacuum fluorescent display (VFD). If the display module is formed as a light emitting diode (hereinafter, may be referred to as "LED"), advantages such as long lifetime and low power consumption of the light emitting diode may be provided. However, considering a relatively high cost of the LED, a problem occurs in that the product cost of the cooking appliance to which LEDs are applied is increased. Therefore, the vacuum fluorescent display (hereinafter, may be referred to as "VFD") is generally used as the display module to reduce the product cost of the cooking appliance.

Also, various types of VFDs are disclosed depending on a color of light irradiated from the VFD, and the cost of the VFD is varied depending on a color of light irradiated from the VFD. For example, the cost of the VFD that irradiates a white light is higher than that of the VFD that irradiates a green light, but lifetime of the VFD that irradiates a white light is shorter than that of the VFD that irradiates a green light.

SUMMARY

In one aspect, a cooking appliance includes a cabinet that defines an external appearance of the cabinet and at least one cooking unit provided in the cabinet and configured to perform cooking of food using a heat source. The cooking appliance also includes a display device configured to display cooking information carried out by the at least one cooking unit. The display device includes a display module configured to irradiate light of a first color to display cooking information for the at least one cooking unit to a user and a circuit board arranged at a rear of the display module and configured to control the display module and supply power to the display module. The display device also includes a color conversion filter arranged at a front of the display module and configured to convert the light of the first color irradiated from the display module to light of a second color.

Implementations may include one or more of the following features. For example, the display module may include a vacuum fluorescent display (VFD). Also, the color conversion filter may include polycarbonate (PC), or ABS material of a synthetic resin.

In some implementations, the color conversion filter may be injection molded and may have a third color that is different from the first color and the second color. In these implementations, the third color may be configured to convert the first color into the second color. The first color may be a green color, and the second color may be a white color.

In some examples, the cooking appliance may include a circuit board support arranged at a rear of the circuit board and configured to support the circuit board and the circuit board support may include a plurality of holes defined to emit light generated from the circuit board and the display module. In these examples, the cooking appliance may include a glass unit that is arranged at a front of the color conversion filter and that is coupled with the circuit board support. The color conversion filter, the display module, and the circuit board may be sequentially arranged between the glass unit and the circuit board support.

In some implementations, the cooking appliance may include a display holder arranged between the display module and the circuit board and configured to fix the display module onto the circuit board and fix the color conversion filter to the front of the display module. In these implementations, the display holder may include a first body unit, and first clamp units extended from the first body unit, and the display module may be fixed to the display holder at a front of the display holder through the first clamp units. Also, in these implementations, the first clamp units may include a pair of first extension units extended from both sides in a length direction of the first body unit toward the color conversion filter, and a pair of first hook units that are provided respectively at free ends of the pair of first extension units and that are projected toward a center in the length direction of the first body unit. Further, in these implementations, the first hook units may be projected toward a front surface of the display module and configured to fix a position of the display module.

In some examples, the color conversion filter may include a second body unit corresponding to the front surface of the display module and second clamp units extended from the second body unit, and the color conversion filter may be fixed to the display holder at the front of the display module through the second clamp units. In these examples, the second clamp units may include four second extension units extended from both sides in a length direction of the second body unit toward the display holder, and four second hook units provided respectively at free ends of the four second extension units and projected toward a center in the length direction of the second body unit.

Further, the second hook units may be connected onto four hook holder units provided in the display holder and may be configured to fix a position of the color conversion filter based on the connection of the second hook units with the four hook holder units provided in the display holder. Also, the at least one cooking unit may include a first cooking unit placed on the cabinet and configured to perform cooking using a heat source, and a second cooking unit provided inside the cabinet and configured to perform cooking using the heat source.

In another aspect, a display device may include a display module configured to irradiate light of a first color to display information to a user and a circuit board arranged at a rear of the display module and configured to control the display module and supply power to the display module. The display device also includes a color conversion filter of a third color arranged at a front of the display module and configured to convert the light of the first color irradiated from the display module to light of a second color. The color conversion filter is arranged to allow the user to perceive light from the display module as the converted second color. The third color of the color conversion filter is configured to convert the first color into the second color.

Implementations may include one or more of the following features. For example, the first color may be a green color and the second color may be a white color.

In some implementations, the display device may include a display holder arranged between the display module and the circuit board and configured to fix the display module onto the circuit board and fix the color conversion filter to the front of the display module. The display holder may include a first body unit, and first clamp units extended from the first body unit, and the display module may be fixed to the display holder at a front of the display holder through the first clamp units. The color conversion filter may include a second body unit corresponding to a front surface of the display module and second clamp units extended from the second body unit, and the color conversion filter may be fixed to the display holder at the front of the display module through the second clamp units.

Both the foregoing general description and the following detailed description are exemplary and explanatory and are intended to provide further explanation of the technology as claimed.

DETAILED DESCRIPTION

Figure 1:
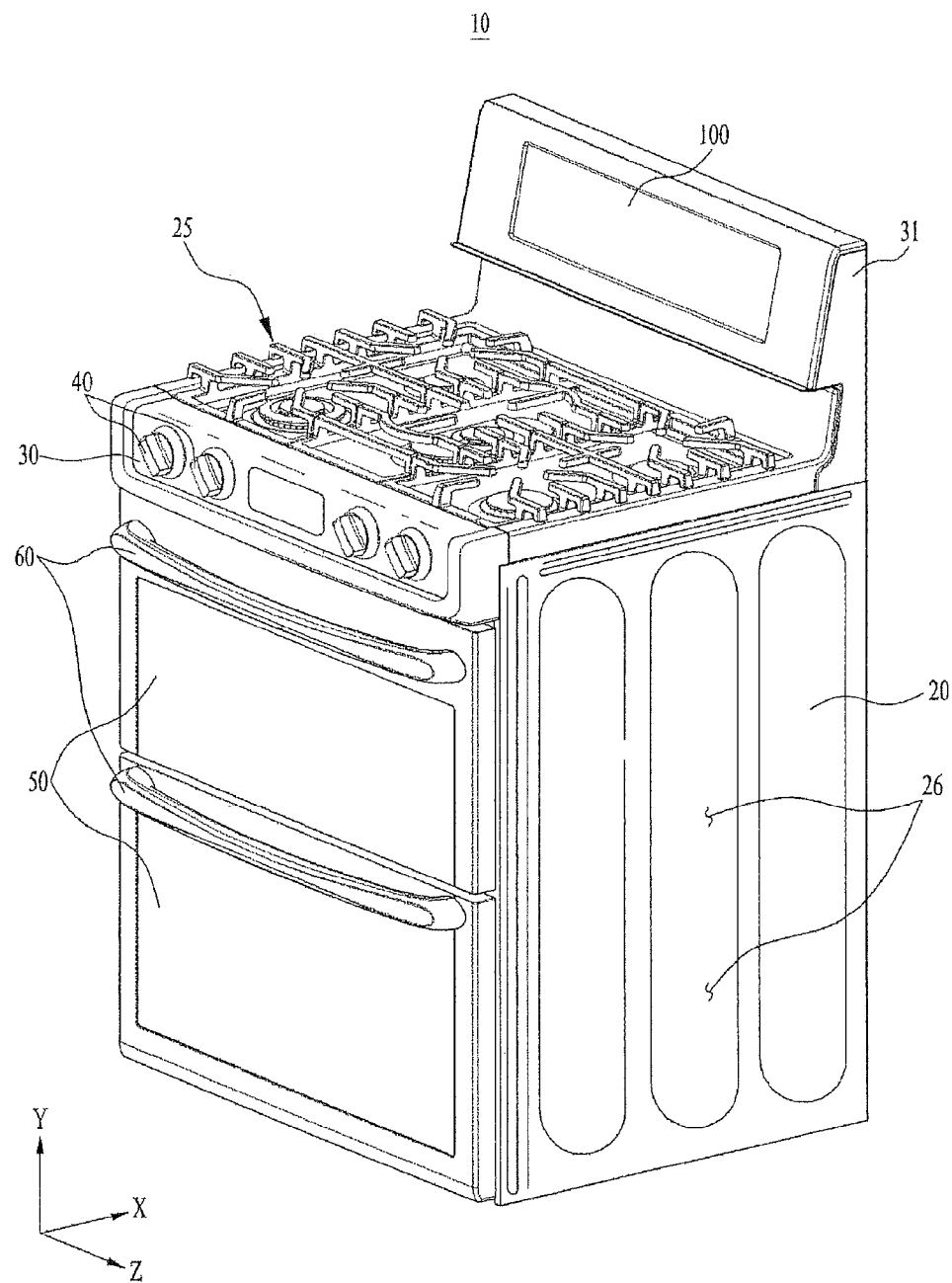
FIG. 1 is a view illustrating an example cooking appliance.

Reference will now be made in detail to the implementations of the present disclosure, examples of which are illustrated in the accompanying drawings. The accompanying drawings show an exemplary implementation, and are not intended to restrict the scope of the present application, but intended to describe an example.

Also, the same reference numbers will be used throughout the drawings to refer to the same or like parts. For convenience of description, size and shape of each element member shown in the drawings may be enlarged or downsized.

FIG. 1 illustrates an example cooking appliance. Features (e.g., features of a display device) of the present application will be described with reference to a cooking appliance (e.g., a gas oven range that uses gas as a heat source) shown in FIG. 1, but may be applied to a microwave oven or an induction range, which cooks food by using electricity as a heat source.

Also, in FIG. 1, X-axis direction will be defined as a front and rear direction (e.g., front and rear), Y-axis direction will be defined as a height direction (e.g., upper and lower portions), and Z-axis direction will be defined as a width direction (e.g., length direction).

Referring to FIG. 1, a cooking appliance 10 may include a cabinet 20 defining an external appearance of the cooking appliance 10, and cooking units 25 and 26 that are provided in the cabinet 20 and that are configured to cook food using a heat source.

The cooking units 25 and 26 may include a first cooking unit 25 and a second cooking unit 26. For example, the first cooking unit 25 on which a cooking container is placed to allow cooking of food inside the cooking container to be carried out may be provided on the cabinet 20, and the second cooking unit 26 in which a target for cooking is received may be provided inside the cabinet 20. The first cooking unit 25 has a shape of a cooktop placed on the cabinet 20, and cooking of food may be carried out at the first cooking unit 25 by using a heat source. If gas is used as the heat source of the first cooking unit 25, the first cooking unit 25 may serve as a gas range, and, if electricity is used as the heat source of the first cooking unit 25, the first cooking unit 25 may serve as an induction range.

Also, the second cooking unit 26 may be provided inside the cabinet 20 in a shape of a cooking chamber, and cooking of food may be carried out inside the second cooking unit 26 by using the heat source.

As shown, two second cooking units 26 may be provided inside the cabinet 20. In some examples, one cooking unit 26 may be provided inside the cabinet 20.

If gas is used as the heat source of the second cooking unit 26, the second cooking unit 26 may serve as a gas oven and, if electricity is used as the heat source of the second cooking unit 26, the second cooking unit 26 may serve as a microwave oven.

If the cooking appliance has only a function of a gas range or an induction range, it will be apparent that the second cooking unit 26 in the shape of the cooking chamber may be omitted.

Also, the first cooking unit 25 and the second cooking unit 26 may be formed to be supplied with gas from an external gas supply source through a gas supply line. An ignition plug for igniting the gas supplied to the first and second cooking units 25 and 26 may be provided in the first and second cooking units 25 and 26. Since the configuration and operation principle of the first and second cooking units 25 and 26 are already disclosed, their detailed description will be referenced, rather than repeated.

A door 50 configured to open and close the second cooking unit 26 may be provided at the front of the cabinet 20, and may have a grip 60. A user may open and close the door 50 using the grip 60.

As shown, two second cooking units 26 may be provided inside the cabinet 20, and two doors 50 and two grips 60 may be provided to correspond to the two cooking units 26. In addition, the cooking appliance 10 may be formed in a single body with the cabinet 20 or may further include front and second panels 30 and 31 so as to be detachably coupled with the cabinet 20. The front panel 30 and/or the rear panel 31 may be provided with various manipulation units for allowing the user to manipulate the cooking appliance 10.

The front panel 30 may be provided at an upper side of the front of the cabinet 20. For example, the front panel 30 may be provided at an upper side of the door 50 at the front of the cabinet 20.

Also, the rear panel 31 may be provided at the upper side of the cabinet 20. For instance, the rear panel 31 may be provided at the rear of the upper side of the cabinet 20. That is, the rear panel 31 may be provided at the rear of the upper side of the cabinet 20 so that the cabinet 20 may be projected upwardly.

In some implementations, although the manipulation unit is shown as being provided on the front panel 30, the manipulation unit having the same function may be provided on the rear panel 31 instead of or in addition to the front panel 30. Also, manipulation units having different functions may be provided on the front panel 30 and the rear panel 31.

The cooking appliance 10 may include a manipulation unit 40, such as a knob configured to apply or release a gas fire to or from the first cooking unit 25 and control intensity of the gas fire. Also, the manipulation unit 40 may be provided on the front panel 30. The user may control driving of the first cooking unit 25 (that is, cooktop) through rotation of the manipulation unit 40.

Also, the cooking appliance 10 may include a display device 100 configured to display cooking information that includes a cooking course carried out by the cooking units 25 and 26 and a cooking time. For example, the rear panel 31 may be configured to display cooking information that includes a cooking course carried out by the second cooking unit 26 and a cooking time.

In addition, the display device 100 may be configured to select the cooking course, which will be carried out at the second cooking unit 26, apply or release the gas fire to or from the second cooking unit 26 and control intensity of the gas fire.

In some implementations, the display device 100 may be have a shape of a touch panel. Therefore, the user may input commands required for the display device 100, such as selection of the cooking course carried out at the second cooking unit 26, running of the selected course, and cancellation of the running course, through a touch of the display device 100. Various types of touch panels that recognize touch input may be used in the display device 100.

The display device 100 may display cooking information, such as a cooking course carried out by the second cooking unit 26 and a cooking time, to the user and, at the same time, receive user input of various control commands (selection of the cooking course, cooking start, cooking cancellation, and cleaning) of the second cooking unit 26.

The display device 100 may be provided on the front panel 30 or the rear panel 31. As shown, the display device 100 may be provided on the rear panel 31. In more detail, the display device 100 may be provided on a front surface of the rear panel 31.

Various light sources (or display modules) may be used for the display device 100 to allow the user to perceive the information displayed on the display device 100. Considering the cost of the light sources or display modules, one or more VFDs may be used as the light sources or display modules.

That is, although a light emitting diode (LED) and a liquid crystal display (LCD) may be used as the display module, the VFD may have advantages, as compared with the LED and the LCD. For instance, brightness of the VFD may be brighter than that of the LED or the LCD and, as a consequence, the VFD may display information to the user more clearly than the LED and the LCD.

Also, the VFD may be easier to be used for a high temperature (that is, more tolerable to a high temperature) than the LED and the LCD. Therefore, the VFD may be more suitable for cooking appliances that generally generate heat of a high temperature.

Also, although the cost of the VFD may be higher than that of the LED, the VFD may realize a graphic more accurately than the LED. In addition, considering preference of a color of a user, the VFD may be configured to irradiate a white light. However, lifetime and cost of the VFD may vary depending on a color of light which is irradiated, and the VFD that irradiates a green light (hereinafter, referred to as "green VFD") may have a lifetime that is longer than lifetime of the VFD that irradiates a white light (hereinafter, referred to as "white VFD") and its cost may be cheaper than that of the white VFD.

In some implementations, a filter may be applied to the display module to allow the user to perceive light, which is irradiated from a VFD (for example, green VFD) other than the white VFD, as a white color, while the VFD (for example, green VFD) other than the white VFD is being used as the light source or display module applied to the display device 100. The display device 100 will be described in more detail with reference to FIG. 2. The display device may be applied to an induction range and a microwave oven, which use electricity as a heat source, an oven range that uses gas as a heat source, or a general home appliance that uses a VFD type display module, such as a display device for a refrigerator and a car, as well as the aforementioned cooking appliance.

Figure 2:
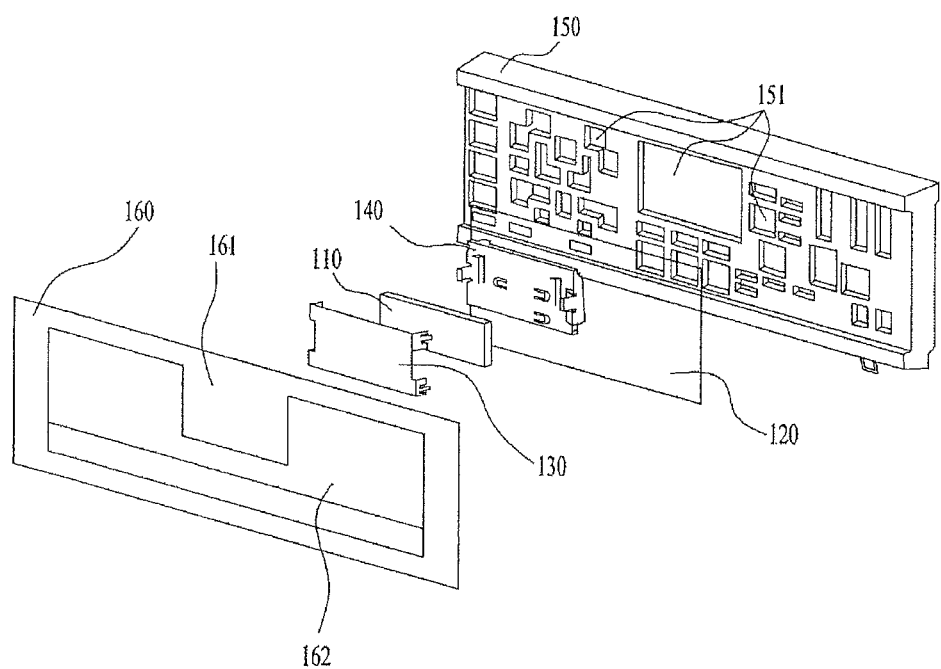
FIG. 2 is an exploded perspective view illustrating an example display device provided in the example cooking appliance shown in FIG. 1.

FIG. 2 illustrates a display device provided in a cooking appliance shown in FIG. 1. Referring to FIG. 2, the display device 100 provided in the cooking appliance 10 may include a display module 110 configured to irradiate light of a particular color, a circuit board 120 configured to control the display module 110, and a color conversion filter 130 configured to change light of the particular color irradiated from the display module 110 to another color different from the particular color.

The display module 110 may be configured to display information (that is, information for transfer to the user) such as the cooking course carried out at the second cooking unit 26 of the cooking appliance 10 and cooking time. In some implementations, the display module 110 may be configured to irradiate light of a first color to display the information displayed on the display device 100.

For example, the display module 110 may be a vacuum fluorescent display (VFD), and the first color may be a green color. That is, the display module 110 may be the vacuum fluorescent display (VFD) configured to irradiate a green light.

Also, the circuit board 120 may be configured to control the display module 110 and supply a power source to the display module 110. That is, the display module 110 and the circuit board 120 may be electrically connected with each other. Therefore, the power may be supplied from an external power source to the circuit board 120, and the circuit board 120 may apply the power from the external power source to the display module 110.

Also, the circuit board 120 may control the display module 110 to allow information such as the cooking course and cooking time of the second cooking unit 26 to be displayed on the display module 110. The circuit board 120 may be arranged at the rear of the display module 110. For instance, the circuit board 120 may be arranged at an opposite side (that is, rear) of a side (that is, front) of the display module 110, on which information is displayed.

Also, the color conversion filter 130 may be configured to change the light of the first color irradiated from the display module 110 to light of a second color that is different from the first color. The second color may be a white color. In some examples, the color conversion filter 130 may be arranged at a position corresponding to the display module 110 at the front of the display module 110. That is, the color conversion filter 130 may be arranged at a side of the display module 110, on which information is displayed.

Therefore, even though the light of the first color (green) is irradiated from the display module 110, since the user perceives the light that has passed through the color conversion filter 130, the color perceived by the user may be the second color (white). The above description that the first color may be green and the second color may be white corresponds to an example implementation for convenience of description. Each of the first and second colors may be another color other than green and white.

For instance, even though the particular light of the first color is irradiated from the display module 110, the light of the first color that has passed through the color conversion filter 130 may be perceived by the user by being changed to the second color that is different from the first color based on a thickness and a color of the color conversion filter 130.

In particular, the light of the first color irradiated from the display module 110 may be perceived by the user by being changed to the second color different from the first color based on a color (that is, a third color) of the color conversion filter 130. For example, the second color finally perceived by the user may be a white color that users may find clear and desirable. Therefore, the third color of the color conversion filter 130 may be determined based on the color (that is, the first color) of the light irradiated from the display module 110.

In some implementations, the color conversion filter 130 may be formed of a polycarbonate (PC) or ABS material which is a synthetic resin. Considering that the second cooking unit 26 is a cooking chamber of a high temperature, the color conversion filter 130 may be formed of a polycarbonate (PC) having a relatively high melting point.

The color conversion filter 130 may be formed by injection molding to have the third color which is previously determined. That is, a pigment or dye may be added to the color conversion filter 130 during the step of forming the color conversion filter 130 as a polycarbonate (PC) or an ABS material which is a synthetic resin, so that the color conversion filter 130 may have the third color.

For example, the third color of the color conversion filter 130 may be the color that the light of the first color irradiated from the display module 110 is converted to the white color (that is, second color) to be perceived by the user. In some implementations, the display module 110 may be formed to irradiate green (first color) light, and the color conversion filter 130 may be a red color (that is, a third color) so that the color (that is, a second color) perceived by the user may be a white color. The red color corresponding to the third color may be a red based color, for example, a red color or a pink color.

As described above, the color (that is, third color) of the color conversion filter 130 may be the particular color for converting the light of the first color irradiated from the display module 110 to the light of the second color perceived by the user by passing through the color conversion filter 130. Also, the third color of the color conversion filter 130 may be determined based on the first color and the second color. That is, the third color may be determined such that the light of the first color irradiated from the display module 110 is converted to the second color to be perceived by the user after passing through the color conversion filter 130 of the third color. Therefore, if the color (that is, first color) of the light irradiated from the display module 110 is previously set and the color (that is, second color) desired to be perceived by the user is previously set, the color (that is, third color) of the color conversion filter 130 may be determined such that the light of the first color may be converted to the second color while passing through the color conversion filter 130.

In addition, the display device 100 may further include a circuit board support 150 arranged at the rear of the circuit board 120 and configured to support the circuit board 120. The circuit board support 150 may allow the circuit board 120 to be placed on one side (for example, front surface) of the circuit board support 150.

Also, a plurality of holes 151 may be formed in the circuit board support 150. That is, a plurality of holes 151 may be formed in the circuit board support 150 to emit heat generated from the circuit board 120 and the display module 110. An external power source and the circuit board 120 may be connected with each other by a wire, etc. through the plurality of holes 151.

The display device 100 may further include a glass unit 160 arranged at the front of the color conversion filter 130. The glass unit 160 may be coupled with the circuit board support 150. For example, the glass unit 160 may be formed in a shape of a rectangle. Four corners of the glass unit 160 may be coupled with the circuit board support 150.

Therefore, the color conversion filter 130, the display module 110 and the circuit board 120 may sequentially be arranged between the glass unit 160 and the circuit board support 150.

Also, the glass unit 160 may include a transparent glass unit 161 through which the light (that is, light of second color) that has been irradiated from the display module 110 and has passed through the color conversion filter 130 passes without color change, and a touch input unit 162 that may allow the user to input a command for controlling the second cooking unit 26. For instance, the transparent glass unit 161 may be provided at the center in a length direction (that is, width direction) of the glass unit 160, and may be made of a glass material such that the light (that is, light of second color) that has passed through the color conversion filter 130 may be perceived by the user by passing through the transparent glass unit 161.

Also, the transparent glass unit 161 may be provided at a position corresponding to the display module 110 and the color conversion filter 130. Further, the touch input unit 162 may have a shape of a touch panel, and the user may input a command for controlling the second cooking unit 26 by a touch through the touch input unit 162.

The touch input unit 162 may be omitted from the glass unit 160, and the entire glass unit 160 may be formed as the transparent glass unit 161.

In addition, the display device 100 may further include a display holder 140 arranged between the display module 110 and the circuit board 120 and configured to fix the display module 110 onto the circuit board 120 and fix the color conversion filter 130 to the front of the display module 110. The display holder 140 will be described in more detail below with reference to FIG. 4.

Figure 3:
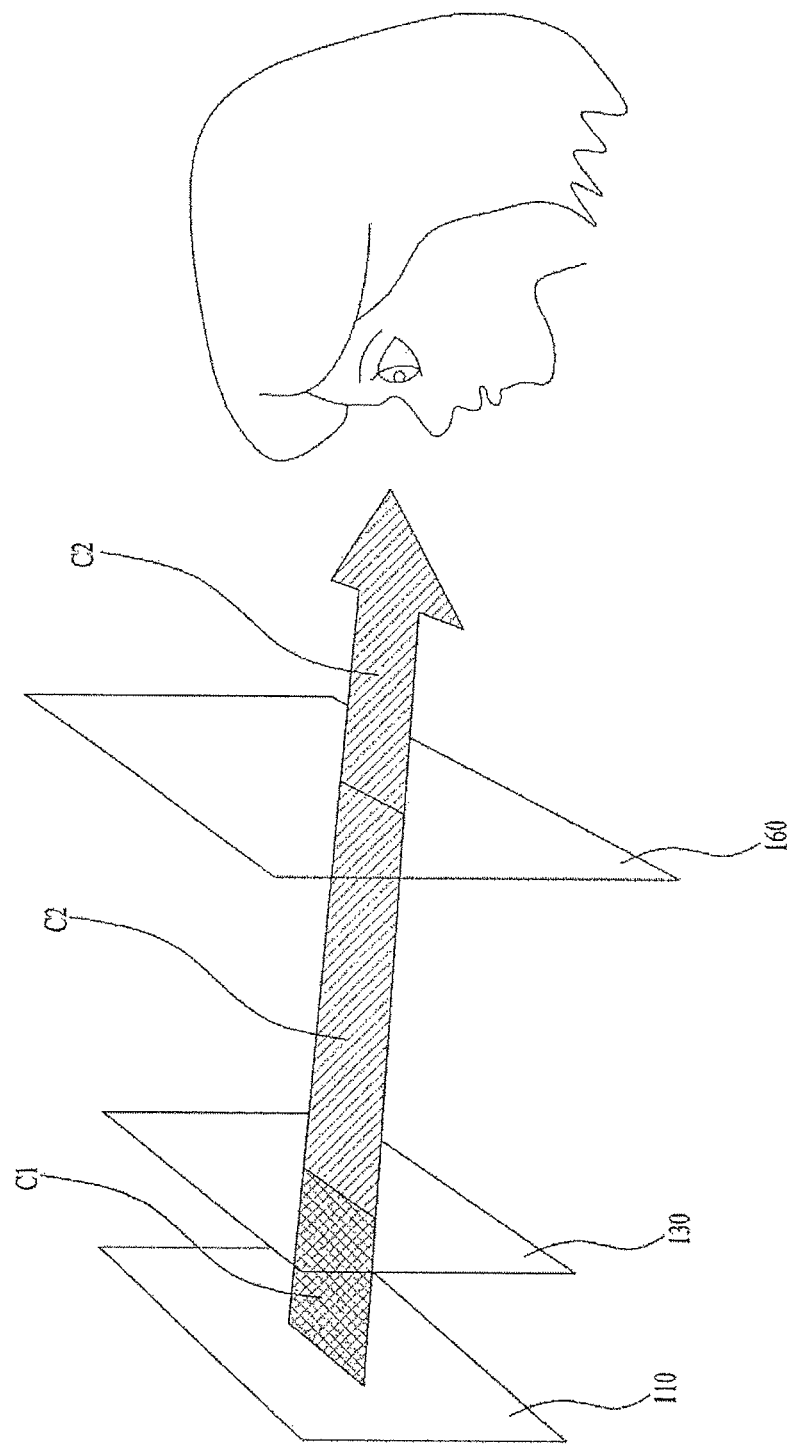
FIG. 3 is a view illustrating an example in which light irradiated through a display device shown in FIG. 2 is changed to a different color to allow a user to perceive the different color.

Hereinafter, a principle that the color of the light irradiated from the display device (that is, display module) is changed to a particular color to be perceived by the user will be described with reference to FIG. 3. FIG. 3 illustrates an example principle in which light irradiated through a display device shown in FIG. 2 is changed to a particular color to allow a user to perceive the particular color.

Referring to FIGS. 2 and 3, the color conversion filter 130 may be arranged at the front of the display module 110, and the glass unit 160 may be arranged at the front of the color conversion filter 130.

In more detail, the color conversion filter 130 may be arranged at a position corresponding to the display module 110 at the front of the display module 110. Also, the glass unit 160 may be arranged at a position corresponding to the display module 110 and the color conversion filter 130 at the front of the color conversion filter 130.

As shown, the display module 110 may be configured to irradiate light C1 of the first color. Also, the color conversion filter 130 may be configured to convert the light C1 of the first color irradiated from the display module 110 to light C2 of the second color while passing through the color conversion filter 130. Further, the glass unit 160 may be configured such that the light C2 of the second color that has passed through the color conversion filter 130 may be perceived by the user as the light C2 of the second color without color change. For example, the glass unit 160 may be formed of a transparent glass.

Therefore, the light C1 of the first color irradiated from the display module 110 may be converted to the light C2 of the second color through the color conversion filter 130 and then perceived by the user as the light C2 of the second color.

In some examples, the display module 110 may be a VFD configured to irradiate a green light by considering lifetime and cost of the VFD that irradiates a green light. That is, lifetime of the VFD that irradiates a green light may be longer than that of the VFD that irradiates a white light, and its cost may be cheaper than that of the VFD that irradiates a white light.

In some examples, in order for the green light irradiated from the VFD to be converted to the white light perceived by the user, the color conversion filter 130 may have a red color (or pink color). Therefore, while VFDs irradiating a green light, of which lifetimes are relatively long and costs are relatively cheap, are being used as the display module 110, the color of the light perceived by the user may be converted to a white color, which may be preferred by users over the green color. To achieve the desired conversion, the color (third color) of the color conversion filter 130 may be determined based on the color (that is, first color) of the light irradiated from the display module 110 and the color (that is, second color) finally perceived by the user from the first color through the color conversion filter 130.

Figure 4:
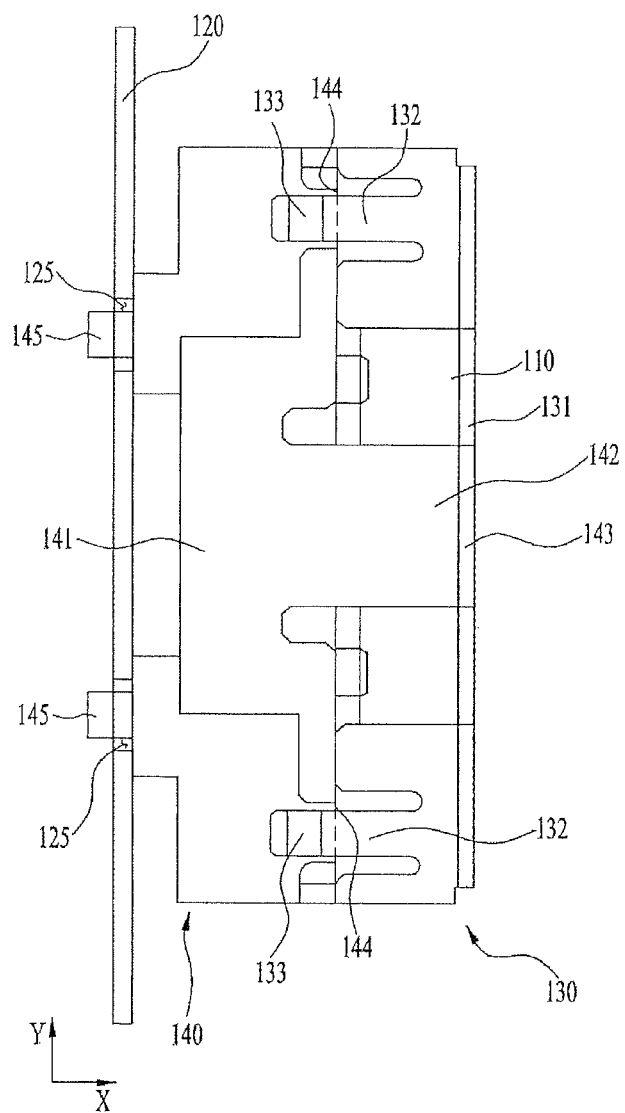
FIG. 4 is a side view illustrating an example state in which an example color conversion filter, an example display module, an example display holder, and an example circuit board in the example display device shown in FIG. 2 are coupled with one another.

Hereinafter, a coupling relation between the color conversion filter 130 and the display holder 140 of the display device 100 will be described in more detail. FIG. 4 illustrates an example state in which a color conversion filter, a display module, a display holder, and a circuit board in a display device shown in FIG. 2 are coupled with one another, and FIG. 5 illustrates an example state in which a color conversion filter, a display module, a display holder, and a circuit board in a display device shown in FIG. 4 are coupled with one another.

Figure 5:
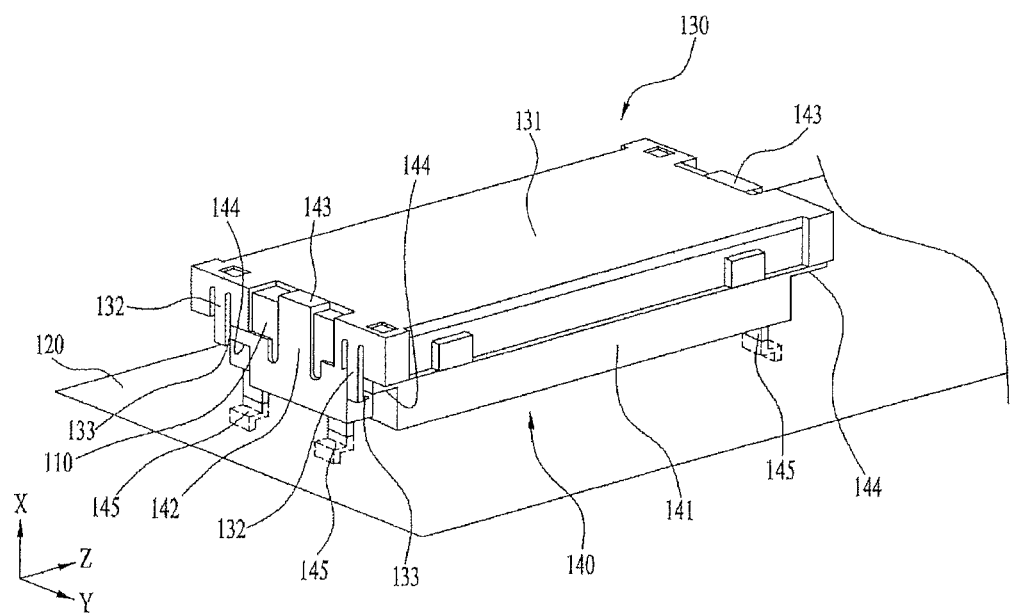
FIG. 5 is a perspective view illustrating an example state in which an example color conversion filter, an example display module, an example display holder, and an example circuit board in the example display device shown in FIG. 4 are coupled with one another.

In FIGS. 4 and 5, X-axis direction will be defined as a front and rear direction (that is, front and rear), Y-axis direction will be defined as a height direction (that is, upper and lower portions), and Z-axis direction will be defined as a length direction (or width direction).

Referring to FIGS. 2, 4 and 5, the display device 100 may include a display holder 140 configured to fix the display module 110 onto the circuit board 120 and fix the color conversion filter 130 to the front of the display module 110. The display holder 140 may be arranged between the display module 110 and the circuit board 120.

Also, a rear surface of the display holder 140 may be fixed to a front surface of the circuit board 120, and the display module 110 may be fixed to a front surface of the display holder 140. For example, the display holder 140 may be coupled onto the circuit board 120 by a fastening method (that is, a bolt or hook fastening method) of one or more fastening members 145.

As shown, one or more fastening members 145 provided on the rear surface of the display holder 140 may be fastened into one or more fastening holes 125 located on the circuit board 120, whereby the display holder 140 may be coupled with the circuit board 120. Even though the display holder 140 is arranged between the display module 110 and the circuit board 120, electric connection between the display module 110 and the circuit board 120 may be maintained.

Also, the display module 110 may be fixed at a particular position on the circuit board by the display holder 140. For instance, the display holder 140 may prevent the display module 110 from being moved on the circuit board 120, thereby preventing electric connection between the display module 110 and the circuit board 120 from being disconnected or preventing the display module 110 from being damaged.

In some implementations, the display holder 140 may be provided with a first body unit 141 and first clamp units 142 and 143 extended from the first body unit 141.

The first body unit 141 may have a shape of a rectangle having a predetermined thickness. Also, the first clamp units 142 and 143 may project from the first body unit 141 toward the front of the first body unit 141. In this regard, the display module 110 may be fixed to the front surface of the display holder 140 through the first clamp units 142 and 143. That is, the display module 110 may be fixed to the front surface of the first body unit 141 of the display holder 140 by the first clamp units 142 and 143 of the display holder 140. Therefore, the display module 110 is fixed to the front surface of the display holder 140 in a state in which the display holder 140 is fixed onto the circuit board 120.

Accordingly, electric disconnection between the display module 110 and the circuit board 120, which is caused by the movement of the display module 110 on the circuit board 120, may be prevented from occurring, and the display module 110 may be prevented from being damaged. For example, the first clamp units 142 and 143 may include a pair of first extension units 142 forwardly extended from both sides in a length direction (that is, width direction) of the first body unit 141 toward the color conversion filter 130, and a pair of first hook units 143 provided respectively at free ends of the pair of extension units 142.

The first extension units 142 may extend from the first body unit 141 toward the front (that is, toward the color conversion filter 130) of the first body unit 141. Also, the first extension units 142 may be provided at the center in a height direction of the first body unit 141 at both sides in the length direction (that is, width direction) of the first body unit 141.

In this regard, the first extension units 142 may forwardly extend from the center in a height direction of the first body unit 141 at both sides in the length direction of the first body unit 141 toward the first conversion filter 130. Also, the pair of first hook units 143 may be provided respectively at free ends of the pair of first extension units 142, and may project toward the center in a length direction of the first body unit 141. That is, the pair of first hook units 143 may project from free ends of the pair of first extension units 142 toward each other.

In some examples, the pair of first hook units 143 may project onto the front surface of the display module 110 so as to fix the position of the display module 110. In this regard, the position of the display module 110 may be fixed between the first body unit 141 and the color conversion filter 130 by the first hook units 143.

In addition, the color conversion filter 130 may be provided with a second body unit 131 corresponding to the front surface of the display module 110, and second clamp units 132 and 133 extended from the second body unit 131. The color conversion filter 130 may be fixed to the display holder 140 at the front of the display module 110 through the second clamp units 132 and 133.

In some implementations, the second clamp units 132 and 133 may include four second extension units 132 extended from both sides in a length direction (that is, width direction) of the second body unit 131 toward the display holder 140, and four second hook units 133 provided respectively at free ends of the four second extension units 132.

The second extension units 132 may extend from the second body unit 131 toward the rear (that is, toward the display holder 140) of the second body unit 131. Also, the second extension units 132 may be provided at upper and lower sides in a height direction of the second body unit 131 at both sides in the length direction of the second body unit 131. That is, the second extension units 132 may backwardly extend from the upper and lower sides in the height direction of the second body unit 131 toward the first body unit 141 of the display holder 140 at both sides in the length direction of the second body unit 131.

For instance, when viewed from a side, the second extension units 132 may be extended to surround the upper and lower sides in a height direction at the side of the display module 110, and the first extension units 141 of the display holder 140 may be extended to surround the center in the height direction at the side of the display module 110.

Due to this structure, the display module 110 may be rigidly fixed to the front surface of the display holder 140 and, at the same time, the color conversion filter 130 may be rigidly fixed to the display holder 140 at the front of the display module 110.

In addition, the second hook units 133 may be provided respectively at free ends of the four second extension units 132, and may project toward the center in the length direction of the second body unit 131. That is, the two second extension units 132 may be extended from one side in the length direction of the second body unit 131, and the other two second extension units 132 may be extended from the other side in the length direction of the second body unit 131.

In some implementations, the second hook units 133 provided in the two second extension units 132 extended from one side in the length direction of the second body unit 131 and the second hook units 133 provided in the other two second extension units 132 extended from the other side in the length direction of the second body unit 131 may project toward each other. For example, the second hook unit 133 provided at free ends of the two second extension units 132 extended from one side in the length direction of the second body unit 131 may project toward the other side in the length direction of the second body unit 131.

The second hook units 133 provided at free ends of the other two second extension units 132 extended from the other side in the length direction of the second body unit 131 may project toward one side in the length direction of the second body unit 131.

Also, when the color conversion filter 130 is coupled with the display holder 140, the four second hook units 133 may be fixed into hook holder units 144 provided in the display holder 140. That is, the four second hook units 133 may be fixed to four hook holder units 144 provided in the display holder 140. In some examples, the four hook holder units 144 provided in the display holder 140 may be provided at the position corresponding to the four second hook units 133. As the four second hook units 133 are fixed to the four hook holder units 144 provided in the display holder 140, the position of the color conversion filter 130 may be fixed. That is, the color conversion filter 130 may be combined with the display holder 140 at the front of the display module 110.

For instance, when the color conversion filter 130 is coupled with the display holder 140, the four second hook units 133 may be fixed onto the hook holder units 144 provided in the display holder 140, whereby the color conversion filter 130 may be fixed to the first body unit 141 of the display holder 140. As described above, the position of the display module 110 may be fixed by the display holder 140 provided on the circuit board 120, and the position of the color conversion filter 130 may be fixed in such a manner that the color conversion filter 130 is combined with the display holder 140 through the second hook units 133 at the front of the display module 110.

It will be apparent to those skilled in the art that the present disclosure can be implemented in other forms without departing from the spirit and essential characteristics of the disclosure. Thus, the above implementations are to be considered in all respects as illustrative and not restrictive. The scope of the disclosure should be determined by reasonable interpretation of the appended claims and all changes which come within the equivalent scope of the disclosure.

What is claimed is:

1. A cooking appliance comprising:
 a cabinet that defines an external appearance of the cabinet;
 at least one cooking unit provided in the cabinet and configured to perform cooking of food using a heat source;
 a display device configured to display cooking information carried out by the at least one cooking unit, the display device comprising:
  a display module configured to irradiate light of a first color to display cooking information for the at least one cooking unit to a user;
  a circuit board arranged at a rear of the display module and configured to control the display module and supply power to the display module; and
  a color conversion filter arranged at a front of the display module and configured to convert the light of the first color irradiated from the display module to light of a second color; and
 a display holder arranged between the display module and the circuit board and configured to fix the display module onto the circuit board and fix the color conversion filter to the front of the display module.

2. The cooking appliance according to claim 1, wherein the display module includes a vacuum fluorescent display (VFD).

3. The cooking appliance according to claim 1, wherein the color conversion filter includes polycarbonate (PC), or ABS material of a synthetic resin.

4. The cooking appliance according to claim 1, wherein the color conversion filter is injection molded and has a third color that is different from the first color and the second color.

5. The cooking appliance according to claim 4, wherein the third color is configured to convert the first color into the second color.

6. The cooking appliance according to claim 1, wherein the first color is a green color, and the second color is a white color.

7. The cooking appliance according to claim 1, further comprising a circuit board support arranged at a rear of the circuit board and configured to support the circuit board,
wherein the circuit board support includes a plurality of holes defined to emit light generated from the circuit board and the display module.

8. The cooking appliance according to claim 7, further comprising a glass unit that is arranged at a front of the color conversion filter and that is coupled with the circuit board support,
wherein the color conversion filter, the display module, and the circuit board are sequentially arranged between the glass unit and the circuit board support.

9. The cooking appliance according to claim 1, wherein the display holder includes a first body unit, and first clamp units extended from the first body unit, and the display module is fixed to the display holder at a front of the display holder through the first clamp units.

10. The cooking appliance according to claim 9, wherein the first clamp units include a pair of first extension units extended from both sides in a length direction of the first body unit toward the color conversion filter, and a pair of first hook units that are provided respectively at free ends of the pair of first extension units and that are projected toward a center in the length direction of the first body unit.

11. The cooking appliance according to claim 10, wherein each first hook unit is projected toward a front surface of the display module and configured to fix a position of the display module.

12. The cooking appliance according to claim 11, wherein the color conversion filter includes a second body unit corresponding to the front surface of the display module and second clamp units extended from the second body unit, and the color conversion filter is fixed to the display holder at the front of the display module through the second clamp units.

13. The cooking appliance according to claim 12, wherein the second clamp units include four second extension units extended from both sides in a length direction of the second body unit toward the display holder, and four second hook units provided respectively at free ends of the four second extension units and projected toward a center in the length direction of the second body unit.

14. The cooking appliance according to claim 13, wherein the second hook units are connected onto four hook holder units provided in the display holder and configured to fix a position of the color conversion filter based on the connection of the second hook units with the four hook holder units provided in the display holder.

15. The cooking appliance according to claim 1, wherein the at least one cooking unit includes a first cooking unit placed on the cabinet and configured to perform cooking using a heat source, and a second cooking unit provided inside the cabinet and configured to perform cooking using the heat source.

\* \* \* \* \*